United States Patent [19]
Arakawa et al.

[11] 3,725,497
[45] Apr. 3, 1973

[54] PROCESS FOR THE OLIGOMERIZATION OF ETHYLENE

[76] Inventors: Takaaki Arakawa, 2-4, 1-chome, Muronki-cho; Kenji Saeki, 12-57, 5-chome, Shozoku-cho, both of Iwakuni-shi, Yamaguchi; Yoshikuni Sato, 12-35, 2-chome, Shinmachi, Otake-shi, Hiroshima; Yoriya Kitazawa, 213-3, Oaza Waki, Waki-mura, Kuga-gun, Yamaguchi, all of Japan

[22] Filed: Sept. 20, 1971

[21] Appl. No.: 182,231

Related U.S. Application Data

[62] Division of Ser. No. 862,029, Sept. 29, 1969, Pat. No. 3,652,705.

[30] Foreign Application Priority Data

| Oct. 3, 1968 | Japan | 43/71612 |
|---|---|---|
| Oct. 3, 1968 | Japan | 43/71613 |
| Oct. 3, 1968 | Japan | 43/71614 |
| Oct. 3, 1968 | Japan | 43/71616 |
| Feb. 25, 1969 | Japan | 44/13605 |
| Feb. 25, 1969 | Japan | 4/13606 |
| Mar. 25, 1969 | Japan | 44/22043 |

[52] U.S. Cl. .......................................... 260/683.15 D
[51] Int. Cl. ............................................... C07c 3/10
[58] Field of Search ............................ 260/683.15 D

[56] References Cited

UNITED STATES PATENTS

| 3,108,145 | 10/1963 | Antonsen | 260/683.15 |
|---|---|---|---|
| 3,441,630 | 4/1969 | Langer et al. | 260/683.15 |
| 3,474,157 | 10/1969 | White et al. | 260/683.15 |
| 3,660,518 | 5/1972 | Cull et al. | 260/683.15 |

*Primary Examiner*—Paul M. Coughlan, Jr.
*Attorney*—Sherman & Shalloway

[57] ABSTRACT

A process for the preparation of higher olefins by oligomerization of ethylene, which comprises contacting ethylene with a catalyst in a solvent at temperatures ranging from −30° − +80° C., the catalyst being prepared by the steps of reacting titanium tetrachloride with at least one ketone electron donor, and mixing the reaction product with an aluminum alkyl halide component containing 1.8 − 2.8 bonded halogen atoms per one aluminum atom.

6 Claims, No Drawings

PROCESS FOR THE OLIGOMERIZATION OF ETHYLENE

This application is a division of application Ser. No. 862,029 filed Sept. 29, 1969, now U.S. Pat. No. 3,652,705.

This invention relates to a process for the preparation of higher olefins of eight to 20 carbon atoms of high linearity, which are useful as the starting materials of plasticizers and detergents, with high selectivity, by oligomerization.

It is known that the catalyst system composed of titanium tetrachloride and dialkyl aluminum halide is useful for polymerizing ethylene to make high molecular weight polyethylene, and the binary catalyst system composed of titanium tetrachloride and alkyl aluminum dichloride serves to polymerize ethylene to make higher olefins. However, with the latter catalyst the degree of polymerization of ethylene is still relatively high, and most of the product is a waxy polyolefin of a molecular weight not lower than 300. Thus, the latter polymerization method is unsatisfactory as an industrial means for making higher olefins of eight to 20 carbon atoms which are useful as the starting materials of plasticizers and detergents.

Research has long been conducted to develop a process for the oligomerization of ethylene to produce linear higher olefins of eight to 20 carbon atoms with high yield. It has now been discovered that the catalyst system prepared by adding an alkyl aluminum halide component to the reaction product of titanium tetrachloride with at least one ketone electron donor is particularly effective for the synthesis of linear higher olefins of eight to 20 carbon atoms through the oligomerization of ethylene. Furthermore, it has been discovered that since the specified catalyst gives the higher olefins of greatly improved linearity over those obtained using the binary catalyst of titanium tetrachloride and alkyl aluminum dichloride, the catalyst of the present invention is extremely useful in the synthesis of starting materials for soft synthetic detergents.

According to the invention, a process for the preparation of higher olefins by oligomerization of ethylene is provided, which comprises contacting ethylene with a catalyst in a solvent at temperatures ranging from −30° − +80° C., the catalyst being prepared by the steps of reacting titanium tetrachloride with at least one ketone electron donor, and mixing the reaction product with an aluminum alkyl halide component containing 1.8 − 2.8 atoms of bonded halogen atoms per one aluminum atom.

The catalyst employed in the subject process is prepared by the following procedures.

First, at least one ketone is reacted with titanium tetrachloride (TiCl$_4$) to form a complex compound. The reaction progresses by maintaining the solvent, in which TiCl$_4$ and ketone electron donor are concurrently present, at −20° − +100° C., preferably 0° − 50° C. for approximately five to 60 minutes.

The catalyst of the invention is prepared by mixing the obtained complex of TiCl$_4$ and ketone electron donor with an aluminum alkyl halide component containing 1.8 − 2.8 bonded halogen atoms per one aluminum atom. As the aluminum alkyl halide component containing 1.8 − 2.8 bonded halogen atoms per one aluminum atom, for example, the following alkyl aluminum dihalides are preferably used: methylaluminum dichloride, ethylaluminum dichloride, ethylaluminum dibromide, propylaluminum dichloride, butylaluminum dichloride, etc. It is also permissible to mix more than one of such alkyl aluminum dihalides. Also, mixtures of trialkyl aluminum, dialkyl aluminum halide, alkyl aluminum sesquihalide, alkyl aluminum dihalide, aluminum trihalide, etc., containing 1.8 − 2.8 bonded halogen atoms per one aluminum atom may be used.

It is important for the preparation of catalyst used in this invention, to react TiCl$_4$ with the ketone electron donor prior to mixing with the alkyl aluminum halide component. If the three components are simply mixed, or the ketone electron donor is first reacted with the alkyl aluminum halide component and thereafter mixed with TiCl$_4$, the resulting catalysts show only negligible activity.

The ketones to be reacted with titanium tetrachloride include monoketones of the general formula

and like diketones of the general formula

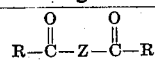

in which R represents an alkyl of one to 5 carbon atoms, or aryl of six to 8 carbon atoms (R's may be same or different), and Z represents an alkylene of one to three carbon atoms. More specifically, R may be methyl, ethyl, isopropyl, phenyl, and the like, and Z may be methylene, ethylene, and the like. Particularly dialkyl ketones such as acetone, ethyl methyl ketone, diethyl ketone, diisopropyl ketone; alkyl aryl ketones such as acetophenone; and β-diketones such as acetylacetone, are preferred for their strong electron donating property.

The mol ratios of the components employed for the preparation of the catalyst in this invention are as follows: the ketone compound or compounds used as the electron donor is (are) within the range of 0.1 − 5 mols, preferably 0.2 − 2 mols, per mol of titanium tetrachloride. Also per mol of titanium tetrachloride, the alkyl aluminum halide component is used within the range of 0.3 − 50 mols, preferably 1 − 10 mols.

According to a preferred method of preparation of the catalyst using the foregoing components, first at least one ketone electron donor is added to titanium tetrachloride which is dissolved or suspended in a suitable solvent, and reacted to form a complex compound, followed by the addition of the alkyl aluminum halide component to the reaction system. The foregoing procedures may be performed in an inert gas such as nitrogen, argon, etc. As the useful solvent, aliphatic hydrocarbons such as pentane, hexane, heptane; alicyclic hydrocarbons such as cyclohexane; aromatic hydrocarbons such as benzene, toluene and xylenes; halogenated aliphatic hydrocarbons such as dichloromethane, dichloroethane, trichloroethylene; and halogenated aromatic hydrocarbons such as chlorobenzene, bromobenzene, and dichlorobenzene, etc., may be named. Particularly preferred solvents are aromatic hydrocarbons and halogenated aromatic hydrocarbons, inter alia, toluene and chlorobenzene.

The oligomerization of ethylene can be performed by blowing ethylene into a solvent in which the catalyst is dissolved or suspended. The reaction temperature suitably ranges from −30° − +80° C., preferably from −20°−+30° C. The reaction progresses under any pressure condition such as atmospheric, reduced or elevated, but the most favorable result can be obtained through the reaction under atmospheric to elevated pressure of up to 50 kg/cm². When the reaction conditions are so selected that the ethylene to be polymerized is maintained at liquid state, it is possible to use the ethylene also as the solvent. In that case the reaction is performed without using an additional solvent.

The suitable blowing rate of ethylene ranges approximately from 4 − 300 liter/hr. N.T.P. (normal state) per millimol of titanium tetrachloride, and suitable reaction time ranges from 5 − 180 minutes.

When ethylene is polymerized in the presence of the catalyst prepared as above, higher olefins in the order of the tetramer to decamer of ethylene of high linearity are selectively formed, with little formation of unnecessary waxy polyethylene. Furthermore, since the reaction can be performed under mild conditions, the industrial advantages with respect to operation and apparatus of the process are indeed great.

Hereinafter the process of the invention will be explained in further detail, referring to the following working examples, in which the measurement of carbon numbers in the reaction products was performed by means of conventional gas chromatography.

The term, "linearity," is defined as the number of branches per 100 carbon atoms in the reaction product. Thus, if the reaction product consists solely of $C_{10}$ olefin, "linearity of 95 percent" means that a total of five branches are present in 10 molecules of $C_{10}$ olefin. The measurement of linearity in the examples was in all cases performed by gas chromatography.

EXAMPLE 1

A nitrogen-substituted, 300-ml capacity glass reactor provided with a stirrer, an ethylene gas inlet tube and a thermometer was charged with 100 ml of chlorobenzene as the solvent, and 5 millimols of titanium tetrachloride were dissolved therein. The temperature in the reactor was lowered to −20° C. and then 10 millimols of a ketones specified in Table 1 were added as the electrondoner in each run. After 15 minute reaction under thorough stirring, 15 millimols of ethylaluminum dichloride were added. Upon completion of the catalyst preparation as above, ethylene gas was introduced into the reactor at a pressure slightly higher than the atmospheric level (approximately 50 − 200 mm of mercury). The temperature was gradually raised and the reaction was performed for the time indicated in Table 1, at 0° C. The results are given in Table 1.

TABLE 1

| Run No. | Ketones | Polymerization Reaction Time (min.) | Yields (g) $-C_6$ | $C_8-C_{20}$ | $C_{22}-$ | Selectivity for $C_8-C_{20}$ (%) | Linearity (%) |
|---|---|---|---|---|---|---|---|
| 1 | dimethyl ketone | 90 | 0.8 | 25.3 | 3.9 | 84.3 | 91 |
| 2 | Ethyl methyl ketone | 90 | 1.3 | 23.0 | 4.0 | 81.4 | 96 |
| 3 | Diethyl ketone | 70 | 1.5 | 18.7 | 2.8 | 81.5 | 97 |
| 4 | Diisopropyl ketone | 75 | 1.7 | 30.3 | 4.8 | 82.4 | 98 |
| 5 | Acetophenone | 90 | 0.9 | 22.9 | 4.2 | 82.0 | 96 |
| 6 | Acetylacetone | 100 | 2.0 | 33.9 | 6.2 | 80.6 | 91 |

CONTROL

The same reactor as employed in Example 1 was charged with 100 ml of chlorobenzene as the solvent, and into which 5 millimols of titanium tetrachloride, 10 millimols of dimethyl ketone as an electron donor and 15 millimols of ethylaluminum dichloride were added simultaneously. After 15 minute stirring at −20° C., ethylene was fed into the system, to be oligomerized at 0° C. The results are given in Table 2.

TABLE 2

| Electron Donors | Polymerization Reaction Time (min.) | Yields (g) $-C_6$ | $C_8-C_{20}$ | $C_{22}-$ | Selectivity for $C_8-C_{20}$ (%) | Linearity (%) |
|---|---|---|---|---|---|---|
| Dimethyl Ketone | 90 | 3.3 | 28.0 | 18.7 | 56.0 | 86 |

EXAMPLE 2

In this Example, the type of solvent used was varied in each run to examine the significance of solvent to the reaction. The results are given in Table 3 below.

TABLE 3

| Run No. | Solvent | Electron Donors | Total Yield (g) | Selectivity (%) $C_4-C_6$ | $C_8-C_{30}$ | Linearity (%) | Reaction Condition |
|---|---|---|---|---|---|---|---|
| 1 | Toluene | Diethyl ketone | 25.0 | 6.8 | 78.4 | 94 | Same to Ex. 1 |
| 2 | Carbon tetrachloride | Diethyl ketone | 18.0 | 0.9 | 88.0 | 92 | do. |

While the present invention has been described primarily to the foregoing exemplification, it should be understood that the present invention is in no way to be deemed limited thereto but rather must be construed as broadly as any or all equivalents thereof.

What is claimed is:

1. A process for the preparation of higher olefins by oligomerization of ethylene, which comprises contacting ethylene with a catalyst in a solvent selected from the group consisting of hydrocarbons and halogenated hydrocarbons, at a temperature of from −30° C. to +80° C., said catalyst being prepared by (1) reacting titanium tetrachloride with 0.1–5 mols of at least one ketone selected from monoketones of the formula $$R-\overset{O}{\underset{\|}{C}}-R$$

and diketones of the formula

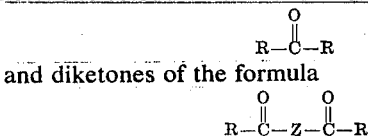

wherein each R independently represents an alkyl group of one to five carbon atoms or an aryl group of six to eight carbon atoms and Z represents an alkylene group of one to three carbon atoms and (2) mixing the reaction product of (1) with an aluminum alkyl halide component containing 1.8 to 2.8 bonded halogen atoms per aluminum atom.

2. The process of claim 1 wherein 0.3 to 50 mols of said aluminum alkyl halide per mol of titanium tetrachloride are mixed with the reaction product of (1).

3. The process of claim 1 wherein ethylene is contacted with said catalyst at a pressure within the range of atmospheric pressure to 50 kg/cm².

4. The process of claim 1 wherein said solvent is a halogenated aromatic hydrocarbon.

5. The process of claim 1 wherein said solvent is an aromatic hydrocarbon.

6. The process of claim 1 wherein said aluminum alkyl halide component comprises at least one member of the group consisting of trialkyl aluminum, dialkyl aluminum halide, alkyl aluminum sesquihalide, alkyl aluminum dihalide, and aluminum trihalide.

* * * * *